May 16, 1967     H. BUERGER     3,320,002

WHEEL RINGS, COVERS OR OTHER TRIMS FOR WHEELS

Filed Feb. 18, 1965     2 Sheets-Sheet 1

INVENTOR.
HERBERT BUERGER
BY
J. B. Feeshin
ATTORNEY.

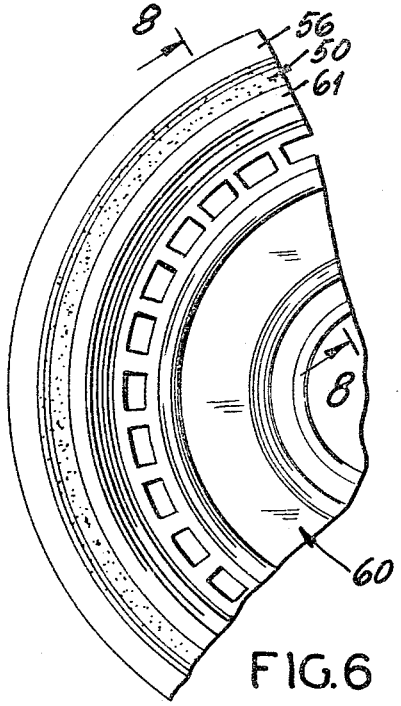
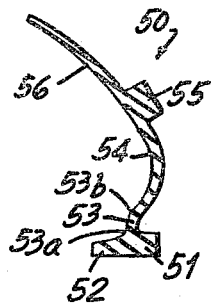
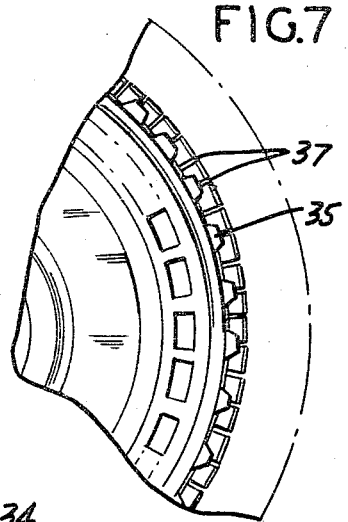
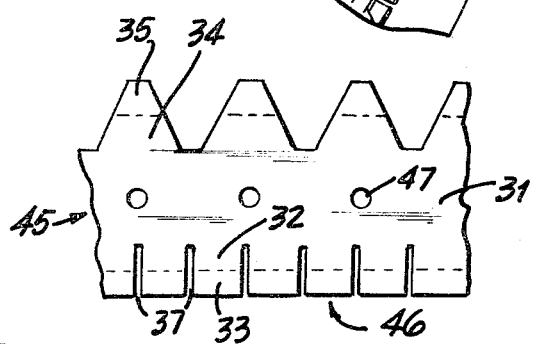
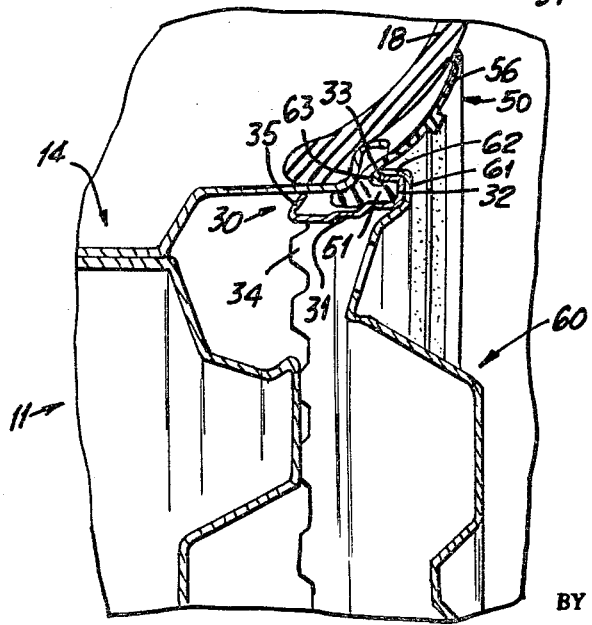
INVENTOR.
HERBERT BUERGER
ATTORNEY.

United States Patent Office 3,320,002
Patented May 16, 1967

3,320,002
WHEEL RINGS, COVERS OR OTHER TRIMS
FOR WHEELS
Herbert Buerger, Walton, N.Y., assignor to Del Krome
Corp., Walton, N.Y., a corporation of New York
Filed Feb. 18, 1965, Ser. No. 433,755
7 Claims. (Cl. 301—37)

This invention relates to wheel rings, covers or other trims for wheels.

An object of this invention is to provide a device of the character described which is provided with improved means to make a black wall tired automobile wheel look like a white wall tire on the wheel.

A further object of this invention is to provide a device of the character described comprising a wheel trim, a clamp ring attached thereto, and a ring of rubber like material attached to the back of the wheel trim and clamp ring and having a black portion surrounding the wheel trim and a white portion surrounding the black portion.

Another object of this invention is to provide a device of the character described in which the wheel trim, which may be in the form of a wheel ring or a wheel cover, has a portion engaging the outside of a channel shaped portion on the clamp ring, and is beaded over to grip an end edge of the flange of said channel shaped portion, and in which the ring of rubber like material has an annular outwardly extending bead gripped in said channel shaped portion and said rubber like ring is pressed by said channel portion against the rim of the tire and overlaps the tire on the rim.

Yet another object of this invention is to provide in a device of the character described a clamp ring having bent back fingers projecting axially and radially outwardly and gripping the inner surface of the tire rim.

Still another object of this invention is to provide in a device of the character described, an annular clamp ring in which the web and outer flange of the channel shaped portion of the ring is slotted radially all around whereby to facilitate gripping of said flange by the wheel trim and to prevent rotation of the rubber like ring relative to said clamp ring.

A still further object of this invention is to provide a strong and durable device of the character described which shall be relatively inexpensive to manufacture, easy to assemble, easy to mount on an automobile tired wheel, and which shall yet be attractive in appearance, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawing, in which is shown various illustrative embodiments of this invention, FIG. 1 is an outer vertical view of a device embodying the invention;

FIG. 4 is a top view of a piece of flat metal stamping out of which the clamp ring is made with the fold lines shown dotted;

FIG. 5 is an enlarged cross-sectional view of the rubber ring in an unflexed state;

FIG. 6 is an outer vertical view (similar to FIG. 1) but illustrating a modified form of the invention;

FIG. 7 is a partial inner view of the structure shown in FIG. 6 with the rubber ring removed, but showing the outer periphery thereof by a dot dash line; and FIG. 8 is a cross-sectional view taken on line 8—8 of FIG. 6 but showing the device embodying the invention mounted on an automobile tired wheel.

Figure 1:
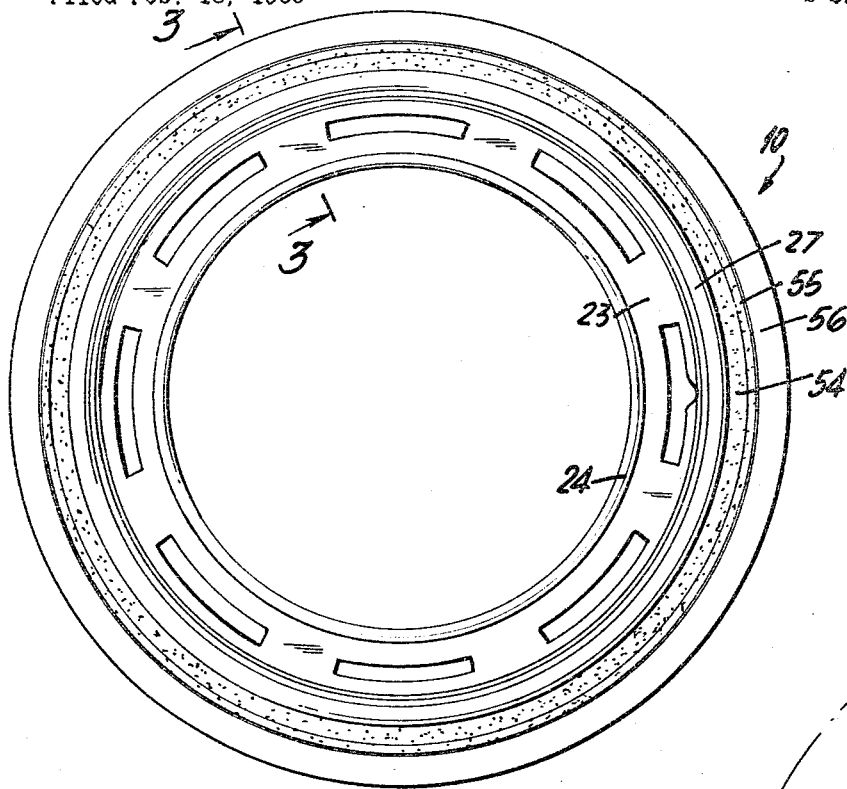

Referring now in detail to the drawing and particularly to FIGS. 1 to 5, 10 designates a device embodying the invention applied to an automobile wheel 11.

The wheel 11 comprises a wheel center portion 12 which may be of usual construction. Fixed to the outer rim portion 13 of the wheel center 12 is a tire rim 14. Said tire rim 14 has a bottom web or portion 15 fixed to portion 13 of the wheel center 12. Extending from said portion 15 is a first axially and radially outwardly inclined portion 16 from which extends a substantially axially outwardly extending portion 17 which supports tire 18. The tire 18 may be a black wall tire.

A concave outwardly curved portion 15a joins portions 15 and 16, and a concave inwardly curved portion 16a joins portions 16 and 17. At the outer end of portion 17 is a concave outwardly curved shoulder portion 17a, from which extends a second axially and radially outwardly inclined portion 17b. At the end of portion 17b is a concave inwardly curved portion 17c. Tire rim 14 is conventional and well known.

In the form of the invention disclosed in FIGS. 1–5, the invention is applied to a wheel trim including a wheel ring 20. A hub cap 21 is mounted on an annular shoulder 22 of the wheel center 12. This hub cap may be of usual construction. The wheel ring 20 as well as the hub cap 21 are preferably made of stamped sheet metal. The wheel ring 20 comprises an annular portion 23 disposed in a vertical plane and surrounding portion 22 of the wheel center 12. At the inner peripheral rim of said portion 23 is a bent back bead 24 somewhat spaced from the hub cap 21 which engages portion 22 of the wheel center 12. Wall 23 terminates inwardly of portion 17 of the tire rim 14. Extending axially outwardly of said portion 23 is an annular flange or body portion 26 which may have a number of steps increasing in diameter in an outward direction. All of wall 26, however, is of lesser diameter than portion 17 of the tire rim 14. The outer end of wall 26 is substantially in the plane of the outer rim portion 17c of the tire engaging portion of said tire rim. The end or bead 18a of the tire 18 contacts the outside surfaces of portions 17, 17a and 17b of the tire rim 14, as is well known. Extending radially outwardly from wall 26 is a web 27 from which extends axially inwardly a flange 28 terminating in a bent back bead 29 for the purpose hereinafter appearing.

Thus an annular inwardly opening channel is formed by wall 26, web 27 and flange 28. It will be noted that flange 28 is disposed radially inwardly of the outer rim portion 17c of tire rim part 17.

Means is provided to clamp wheel ring 20 to the wheel 11. To this end there is provided a clamp ring 30. Said clamp ring 30 comprises an annular stepped wall 31 which surrounds wall 26 of wheel ring 20. At the outer end of wall 31 is a web 32 lying inside of and contacting the inner surface of web 27. Extending axially inwardly from said web 32 is a flange 33 contacting the inner surface of flange 28. The end rim edge of flange 33 is gripped by the rolled back bead 29 of wheel ring 20 to attach said clamp ring to said wheel ring. Extending from said wall 31 are substantially triangular extensions or fingers 34, the outer ends 35 of which are bent back into radially and axially outwardly inclined shape so that their outer tips will grip the inner surface of tire rim portion 17. Web 32 and flange 33 of clamp ring 30 are slitted radially as at 37, FIG. 4, to facilitate making of the clamp ring and for other purposes hereinafter appearing.

The clamp ring 30 may be made from flat straight blank 45 shown in FIG. 4. Said blank may be stamped in straight condition and then lengths thereof bent into a circle with the ends attached to form a ring. It is to be noted that the slots 37 extend the width of the flange 33 and web 32, fold lines being shown dotted in FIG. 4. Between each pair of adjacent slots 37 the combined flange 33 and web 32 form finger 46. The wall 31 may be formed with spaced holes 47 centered with respect to the fingers 35 for the purpose of keeping proper dimensions when turning the flat strip into a ring.

Clamped by the combined wheel rim 20 and clamp ring 30 is a ring 50 made of rubber-like material, the purpose of which is to give the tire 18 the appearance of a white wall tire. This ring will be termed herein as the rubber ring, and may be made of butyl rubber or other rubber-like, flexible, resilient, non-metallic material. The rubber ring 50 comprises an annular axially outwardly extending bead 51 which extends into and is tightly gripped within the inwardly opening channel formed by portions 26, 27 and 28 of the wheel 20 and portions 31, 32 and 33 of the clamp ring 30. Extending axially inwardly from the bead 51 is an annular flange 52 which projects between wall 31 of the clamp ring and portion 17 of the tire rim 14. It will be noted that the inner end of wall 31 and fingers 34 are spaced from wall 26 to allow flexing of the fingers as the device is applied to the wheel.

Extending from the outer side of bead 51 and flange 52 and extending radially and axially outwardly there from is a portion 53 extending to the flange 32, and from which extends an outwardly curved surface 53b. Said portion 53 passes between flange 28 of the wheel ring 20 and portions 17a, 17b and 17c of the tire rim 14. The outside surfaces 53a, 53b, of said flange 52 and portion 53 contact the inside surface of shoulder 17a of the tire rim. Extending radially and axially outwardly of said portion 53 is a portion 54 which overlaps the tire 18. Said portion 54 may be formed with an outwardly extending thickened bead 55. The outer surface of the rubber ring 50 up to the outer end of bead 55 is preferably black whereas the portion 56 extending beyond the bead 55 is preferably white. Any suitable means may be used to obtain the black and white color as by coating or by mixing suitable coloring material into the composition of which member 50 is made.

Figure 3:
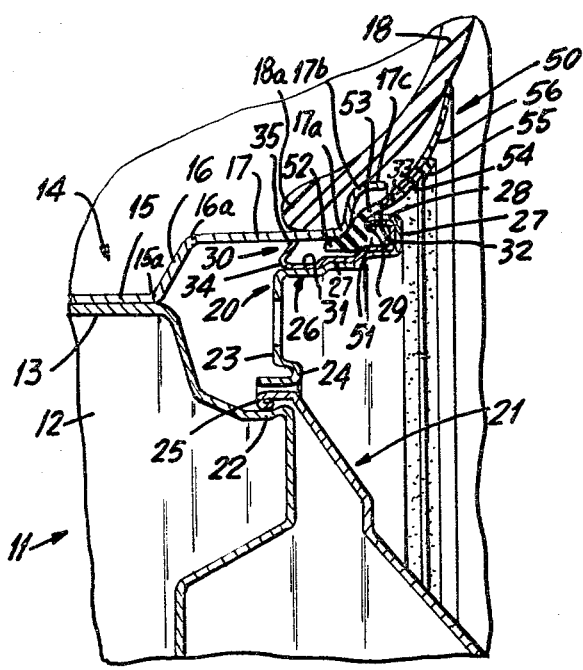
FIG. 3 is a cross-sectional view of said device taken on line 3—3 of FIG. 1, but showing said device mounted on an automobile wheel.
Figure 2:
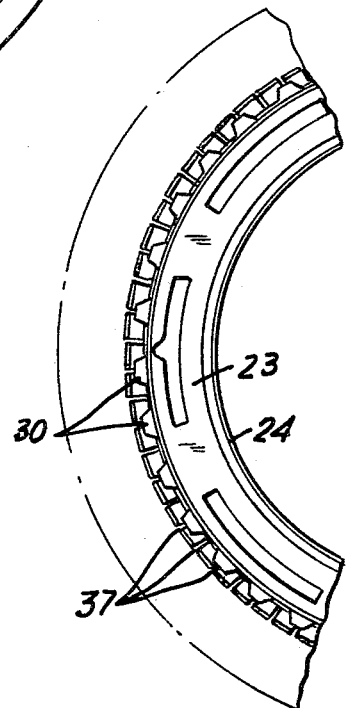
FIG. 2 is a partial inner view thereof with the rubber ring removed, but showing the outer periphery thereof by a dot dash line.

It will be seen from a comparison of FIG. 5 with FIG. 3 or 8, that the portions 54 and 56 of ring 50 are flexed outwardly by the tire when applied to the wheel, and remain closely adjacent the tire.

It will now be understood that although the tire 18 may be black, when one looks at the side of the wheel, the portion 56 of member 50 forms an annular white band at the outer side of which is the black tire and at the inner side of which is the black portion of said member 50, and this contrasts with the metallic finish or appearance of the outer surface of the wheel ring 20, which gives the wheel and its tire an attractive appearance resembling the appearance of a white wall tire.

It will be seen that a unitary assembly is formed of the wheel trim, rubber ring, and clamp ring.

In FIGS. 6, 7 and 8 there is shown a modified construction. The wheel 11 is the same as in FIGS. 1–3. The tire 18 is also the same. The rubber ring 50 is identical to ring 50 of FIGS. 1–3, as is also the clamp ring 30. The only difference is that the wheel 20 and hub cap 21 are replaced by another wheel trim in the form of a wheel cover 60. The term "wheel trim" as used herein includes any means such as rings, covers, or the like, to decorate or trim a wheel. It is this wheel cover that has a web 61 contacting the outer side of web 32 of the clamp ring, a flange 62 at the outside of the flange 33 of the clamp ring, and a bead 63 gripping the outer rim edge of said flange 33. The rubber ring 50 is formed with a bead 51, the same as in FIGS. 1–3 gripped within the channel formed by the wall 31, web 32 and flange 33 of the clamp 30.

It will be noted that beads 29 and 63 are rolled around end edges of cylindrical portions 33, as shown in FIGURES 3 and 8, and present annular radially extending shoulders that interlock with beads 51.

Wheel trims according to the invention may also be used without the rubber ring 50. When the wheel trims are so used without the rubber ring, the outer web 27 or 61, with the portions of the trim adjacent thereto, presents a striking three-dimensional appearance.

It will thus be seen that there is provided an apparatus and article in which the several objects of this invention are achieved, and which is well adapted to meet the conditions of practical use.

As possible embodiments might be made of the above invention, and as various changes might be made in the embodiments above set forth, it is to be understood that all matter herein set forth and shown in the accompanying drawings, is to be interpreted as illustrative and not in a limiting sense.

I claim:

1. In combination, a member adapted to be attached to a wheel and comprising an annular body portion, a radially outwardly projecting annular web portion extending from said body portion, a cylindrical axially inwardly projecting flange portion extending from the outer end of said radially projecting annular web portion, a clamp ring comprising an annular, substantially axially extending portion surrounding said body portion including an axially outer first cylindrical portion, a radially outwardly projecting annular web portion extending from the axially outer end of said first cylindrical portion of said clamp ring, and contacting the inner surface of the radially outwardly projecting web portion of said member, and a second cylindrical portion extending axially inwardly from the outer end of said web portion of said clamp ring, and contacting the inner surface of said flange portion of said member, and spring fingers extending from the axially inner end of the body surrounding portion of said clamp ring, and inclined radially and axially outwardly, and means to attach said clamp ring to said member, said first and second cylindrical portions and said web portion of said clamp ring comprising means forming an inwardly opening annular channel, a white wall tire simulating ring made of rubber-like material having an annular bead disposed within the inwardly opening channel of said clamp ring, and tightly gripped by said web and cylindrical portions of said channel forming means of said clamp ring, and said simulating ring comprising a portion extending radially and axially outwardly from said bead, said means for attaching said member to said clamp ring comprising an annular bead on the flange of said member, rolled around the end edge of the second cylindrical portion of said clamp ring and provides an annular radially extending shoulder interlocking with said bead.

2. The combination of claim 1, said web portion and second cylindrical portion of said clamp ring being slotted radially at spaced intervals all around said channel.

3. The combination of claim 1, said simulating member having an annular relatively dark, radially inner portion, and a relatively light colored annular portion surrounding said relatively dark portion.

4. The combination of claim 1, said body portion of said member including a cylindrical portion concentric with said flange portion of said member, and contacting said first cylindrical portion of said clamp ring.

5. The combination of claim 4, said web portion and second cylindrical portion of said clamp ring being radially slotted at spaced intervals all around said channel.

6. The combination of claim 4, said means for attaching said member to said clamp ring comprising an annular bead on the flange of said member, rolled around the edge of the second flange of said clamp ring.

7. The combination of claim 6, said web portion and second cylindrical portion of said clamp ring being slotted radially at spaced intervals.

References Cited by the Examiner

UNITED STATES PATENTS

| | | | |
|---|---|---|---|
| 2,544,705 | 3/1951 | Lyon | 301—37 |
| 2,624,639 | 1/1953 | Lyon | 301—37 |
| 2,809,076 | 10/1957 | Plotkin | 301—37 |
| 2,970,011 | 1/1961 | Lyon | 301—37 |
| 2,996,336 | 8/1961 | Wood | 301—37 |
| 3,001,827 | 9/1961 | Lyon | 301—37 |
| 3,055,712 | 9/1962 | Shoemaker | 301—37 |
| 3,085,829 | 4/1963 | Barnes | 301—37 |
| 3,174,803 | 3/1965 | Mulhern | 301—37 |
| 3,188,143 | 6/1965 | Kraines | 301—37 |

BENJAMIN HERSH, *Primary Examiner.*

R. J. JOHNSON, *Assistant Examiner.*